Figure 1:
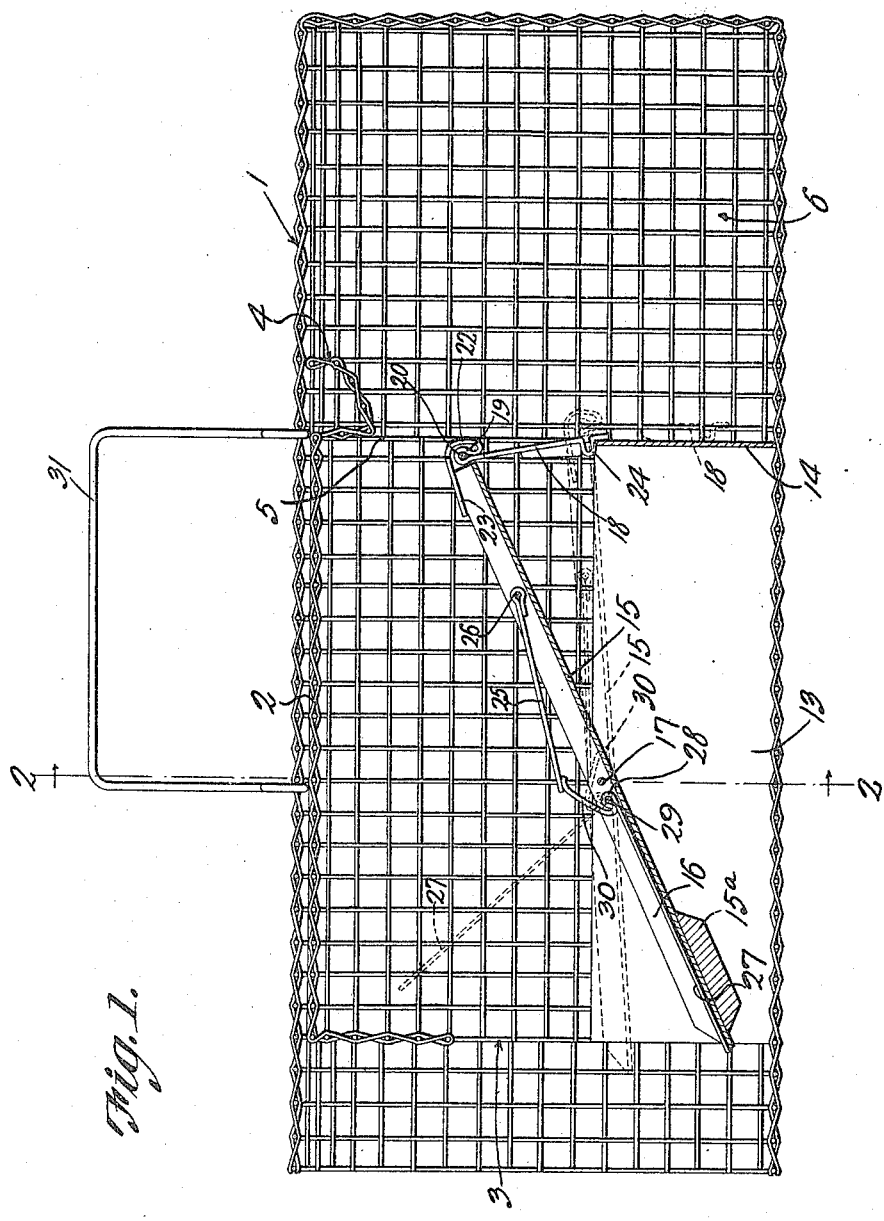

J. H. WILLIAMS & S. BLOSSER.
ANIMAL TRAP.
APPLICATION FILED JAN. 28, 1916.

1,185,036.

Patented May 30, 1916.
2 SHEETS—SHEET 1.

Witnesses

John H. Williams and
Sherman Blosser Inventors by CA Snow & Co.
Attorneys

J. H. WILLIAMS & S. BLOSSER.
ANIMAL TRAP.
APPLICATION FILED JAN. 28, 1916.
1,185,036.
Patented May 30, 1916.
2 SHEETS—SHEET 2.
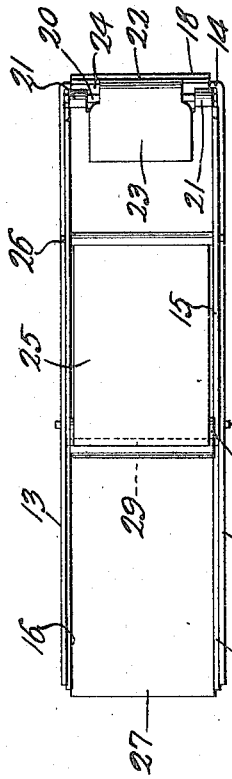
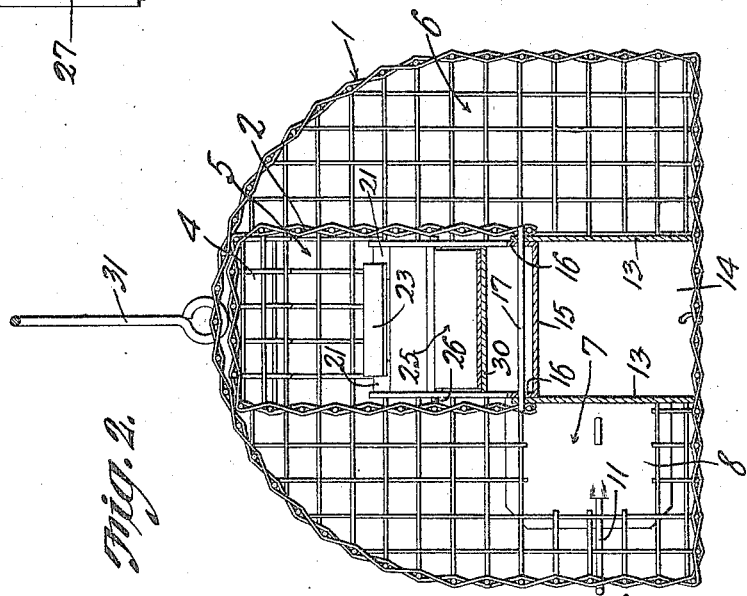
Witnesses
John H. Williams and
Sherman Blosser Inventors
by
Attorneys

UNITED STATES PATENT OFFICE.

JOHN H. WILLIAMS AND SHERMAN BLOSSER, OF COUNCIL GROVE, KANSAS.

ANIMAL-TRAP.

1,185,036.   Specification of Letters Patent.   Patented May 30, 1916.

Application filed January 28, 1916.   Serial No. 74,799.

*To all whom it may concern:*

Be it known that we, JOHN H. WILLIAMS and SHERMAN BLOSSER, citizens of the United States, residing at Council Grove, in the county of Morris, State of Kansas, have invented a new and useful Animal-Trap, of which the following is a specification.

The present invention appertains to traps, and aims to provide a novel and improved device of that character.

It is the object of the invention to provide a trap for catching mice, rats and other rodents or animals, which will reset itself automatically after an animal passes into the confinement or captivity chamber, whereby another animal entering the trap will be caught likewise, the trap embodying novel means for entrapping the animal which enters it and which means is operated automatically to restore the trap to normal position after the animal has passed into the captivity chamber.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a longitudinal vertical section of the improved trap. Fig. 2 is a cross section thereof taken on the line 2—2 of Fig. 1. Fig. 3 is a plan view of the run way and allied parts. Fig. 4 is a perspective view of one corner of the cage illustrating the door for closing the opening leading from the captivity chamber.

The trap embodies an elongated cage 1, preferably, although not necessarily, constructed of wire mesh, and having secured therein a longitudinal entrance member 2 of similar material and of inverted U-shaped cross section. Said entrance member 2 is disposed longitudinally and extends rearwardly from the forward or receiving end of the cage 1 to provide the entrance passage, the member 2 being provided with an entrance opening 3 at its forward end, and a bait holder 4 being provided within the cage 1 at the rear end of the member 2. Said holder 4 can be supplied with bait as the bait becomes exhausted, for attracting the animals to be caught. There is an opening 5 at the rear end of the entrance member 2 below the bait holder 4 which leads to the captivity chamber or compartment 6 provided within the cage 1 and into which the animals pass from the entrance passage, the animals being thus caught in order that they can be exterminated. The rear end of the cage 1 has an opening 7 leading from the captivity chamber 6, in order that the animals can be removed from the trap, and this opening 7 is normally closed by a door 8 having a wire 9 secured to one side edge thereof, and having its terminals bent around, as at 10, one upright wire of the cage 1, to hinge the door 8 to the cage. An L-shaped wire catch or latch 11 has one arm secured in any suitable manner to the door 8, and said latch 11 is adapted to fit the respective corner of the cage, as seen in Fig. 4, the free end of the latch 11 being provided with a hook 12 to engage behind one of the wires of the cage 1 to hold the door 8 closed. The hook 12 can be readily sprung out of engagement from the cage, so that the door can be swung open.

Disposed within the cage 1 below the entrance member 2 is a pair of longitudinal plates 13 set on edge on the bottom of the cage and disposed below and extending to the side portions or wings of the member 2, the rear ends of the plates 13 being united by a cross piece 14 which is integral with said plates. Mounted for rocking or swinging movement between the upper edges of the plates 13 is a runway 15 preferably of channel-shape, and having the upstanding flanges 16 along its side edges. A fulcrum pin 17 is engaged through the flanges 16 between the ends of the runway and through the plates 13 adjacent their upper edges, to pivot the runway between its ends to oscillate about a transverse line between the ends of the entrance passage. Secured to the lower surface of the runway 15 adjacent the forward end thereof is a counter weight 15ª which normally swings the forward end of the runway 15 downwardly, as seen in full lines in Fig. 1, to automatically reset the trap, but the weight 15ª is lighter than the animal to be caught, in order that when the animal passes onto the rear portion of the runway, it will swing downwardly when free to do so. When the rear portion of the runway is raised it closes the opening 5 to the passage of the animal therethrough, until the rear portion of the runway is lowered, but in this position of the runway, the entrance opening 3 is unobstructed to permit of the entrance of the animal onto the runway when attracted by the bait in the holder 4 at the inner end of the runway.

When the trap is set, the rear end of the runway 15 is held in raised position by means of a prop 18 formed from a plate, and having its upper end bent back or looped, as at 19, to loosely embrace a transverse pin 20 attached to the rear end of the runway, the rear end of the runway having at its opposite sides hinge butts or eyes 21 receiving the terminals of the pin 20. The loop 19 is disposed between the hinge butts 21, and the prop 18 can be swung backwardly and forwardly. The portion 19 is provided with a rebent and upwardly projecting portion 22 terminating in a forwardly projecting treadle 23. The prop or detent 18 is provided adjacent its lower end with a kink or bend 24 providing a portion seatable upon the upper edge of the cross piece 14 to hold the rear end of the runway in raised position, as seen in full lines in Fig. 1, the prop 18 swinging forwardly by gravity when the rear end of the runway is raised, in order that the portion 24 will swing onto the cross piece 14 by itself. The treadle 23 is located below but slightly in front of the bait holder 4, in order that the animal in passing up the runway to get at the bait, will tread upon the treadle 23, and the weight of the animal will depress the treadle 23 to swing the prop 18 rearwardly off of the cross piece 14, thus allowing the rear end of the runway to drop to the dotted line position as seen in Fig. 1. This removes the rear portion of the runway from the opening 5, so that the animal will pass through the opening 5 into the captivity chamber. After the animal has passed into the chamber 6, the counter weight 15ª will swing the forward end of the runway downwardly, thereby resetting the trap automatically, the weight of the animal being removed from the rear portion of the runway so that the weight 15ª comes into play for said purpose.

A treadle or tread plate 25 has one end pivotally mounted upon a transverse pin 26 terminally engaged with the flanges 16 near the rear end of the runway, and said treadle 25 projects forwardly toward the entrance opening 3 to operate a door 27. This door or closure plate 27 is provided at its rear end with a bent back portion forming a loop 28 loosely embracing a transverse pin 29 terminally engaged with the flanges 16 in front of the pivot pin 17, and from the loop 28 there projects rearwardly and upwardly a lip 30 upon which rests the forward end of the treadle 25.

The door 27 is pivoted for swinging movement up and down, and the weight of the door 27 normally causes it to swing downwardly upon the forward portion of the runway to leave the entrance opening 3 unobstructed. This swings the lip 30 upwardly to raise the treadle 25, as seen in full lines in Fig. 1. Therefore, when the animal passes through the opening 3 into the entrance passage, it can pass over the door 27 without difficulty, and after the animal passes the pivot of the runway, it steps upon the treadle 25, thereby depressing it and the lip 30, and swinging the door 27 upwardly to the dotted line position in Fig. 1, thus closing the door 27 behind the animal, and trapping it within the entrance passage so the animal cannot back out. The runway does not tilt, however, until it is released by the animal stepping upon the treadle 23 to swing the prop 18 rearwardly off of the cross piece 14, which permits the rear end of the runway to drop, and the animal naturally will pass on through the opening 5 into the captivity chamber. As soon as the weight of the animal is no longer upon the rear portion of the runway, the runway returns to normal position for resetting the trap for another animal.

A bail handle 31 is preferably attached to the top of the cage 1 whereby the trap can be conveniently carried about.

The trap can be constructed in various sizes for catching different species of animals, and other appropriate alterations can be made within the scope of what is claimed without departing from the spirit of the invention.

Having thus described the invention, what is claimed as new is:

1. A trap having a captivity chamber and an entrance passage leading thereto, there being an opening between said chamber and passage, a runway pivoted between its ends between the ends of said passage, the forward portion of said runway normally swinging downwardly so that the rear portion obstructs said opening, a prop pivoted to the rear end of the runway, a cross piece onto which said prop is engageable when the rear end of the runway is raised, the prop having a treadle projecting over the runway whereby when the treadle is depressed the prop is disengaged from the cross piece, and a bait holder at the rear end of the entrance passage above said treadle.

2. A trap having a captivity chamber and an entrance passage leading thereto, there being an opening between said chamber and passage and an entrance opening at the forward end of said passage, a runway pivoted between its ends between the ends of said passage, the forward portion of said runway normally swinging downwardly so that the rear portion thereof obstructs the first mentioned opening, means for holding the rear end of the runway raised until an animal passes onto it, a door pivoted upon the runway and projecting toward the entrance opening, said door having a rearwardly projecting portion, and a treadle pivoted upon the runway and projecting forwardly and resting upon said portion whereby when said treadle is depressed it swings said door upwardly to obstruct the entrance opening.

3. A trap having a captivity chamber and an entrance passage leading thereto, there being an opening between said passage and chamber and an entrance opening at the forward end of said passage, a runway pivoted between its ends between the ends of said passage, the forward end of said runway normally swinging downwardly so that the rear end thereof obstructs the first mentioned opening, a prop having its upper end pivoted to the rear end of said runway, a cross piece upon which said prop is engaged when the rear end of the runway is raised for holding said rear end of the runway in raised position, the prop having a treadle projecting over the runway whereby when said treadle is depressed the prop is released from said cross piece, a door pivoted upon the runway and projecting forwardly toward the entrance opening, said door having a rearwardly projecting portion, and a treadle pivoted upon the runway and projecting forwardly and resting upon said portion, whereby when the last mentioned treadle is depressed it will swing said door upwardly to obstruct the entrance opening.

In testimony that we claim the foregoing as our own, we have hereto affixed our signatures in the presence of two witnesses.

JOHN H. WILLIAMS.
SHERMAN BLOSSER.

Witnesses:
W. J. PIRTLE,
M. B. NICHOLSON.

Copies of this patent may be obtained for five cents each, by addressing the "Commissioner of Patents, Washington, D. C."